United States Patent

[11] 3,632,115

[72] Inventor Itsuki Ban
829 Higashi-Oizumimachi, Nerima-ku, Tokyo-to, Japan

[21] Appl. No. 887,195
[22] Filed Dec. 22, 1969
[45] Patented Jan. 4, 1972
[32] Priority Dec. 24, 1968
[33] Japan
[31] 43/94231

[54] TAPE CARTRIDGE POSITIONING APPARATUS
9 Claims, 4 Drawing Figs.

[52] U.S. Cl. ........................................................ 274/4 B, 179/100.2 Z, 179/100.2 S, 242/55.19 A
[51] Int. Cl. ........................................................ G11b 15/28, G11b 15/66
[50] Field of Search ........................................... 274/4 F, 4 B, 4 C, 4 E, 11 B, 11 C, 11 E; 179/100.2 Z; 242/197–200; 226/175, 181

[56] References Cited

UNITED STATES PATENTS

| | | | |
|---|---|---|---|
| 3,080,101 | 3/1963 | Kreithen ........................ | 274/4 B |
| 3,083,269 | 3/1963 | Gaubert ........................ | 274/4 F |
| 3,126,162 | 3/1964 | MacKenzie .................... | 274/4 F |
| 3,431,367 | 3/1969 | Nickl ............................ | 274/4 F |

*Primary Examiner*—Leonard Forman
*Assistant Examiner*—Dennis A. Dearing
*Attorney*—Jacobs and Jacobs

ABSTRACT: A tape cartridge positioning apparatus for an endless magnetic tape cartridge player comprising a reciprocating lever member having front and rear arms between which the tape cartridge, which is transversely insertable in a player housing, is interposed and slidably mounted on a deck in the player housing and normally held in a first position, a shifting device operated by use of rotational force of a rotary capstan for drivingly feeding the magnetic tape to shift the reciprocating lever member from the first position to a predetermined second position, a latching device for retaining the reciprocating lever member in the second position, a release device for allowing the latching device to release retention of the reciprocating lever member, and a tension spring for returning the disengaged reciprocating lever member to the first position, and wherein the reciprocating lever member is caused to be moved from the first position to the second position, and thus the cartridge is moved to and held in the playing position as the rear edge thereof is urged by the rear arm while the reciprocating lever member is allowed to be returned from the second position to the first position and thus the cartridge is moved from the play position to the nonplaying position as the front edge thereof is urged by the front arm.

INVENTOR

BY

ATTORNEY

TAPE CARTRIDGE POSITIONING APPARATUS

BACKGROUND OF THE INVENTION

The present invention relates to an endless magnetic tape player, and more particularly a novel tape cartridge positioning apparatus for positioning an endless magnetic tape cartridge insertable in the player in the "play" position.

In a well-known endless magnetic tape cartridge player, the cartridge is adapted to use an engaging portion (for instance, a notch formed on the sidewall of the cartridge) provided on the cartridge and to be held in the playing position. That is, the cartridge which has been inserted through an opening in the player housing therein, is held in the playing position by allowing an engaging member formed of a retention roller mounted on a free end of a leaf spring one end of which is fixed to the deck on the player housing to be inserted in the notch in the cartridge. In this case, the retention can press the inclined wall of the notch under the influence of the leaf spring, on the contrary, if the bias of the leaf spring is not proper or location of the retention roller is also inadequate, a relative position of the cartridge to a magnetic head and rotary capstan could not be maintained so that, for instance, running speed of the endless magnetic tape in the cartridge is unstable to cause wow-flutter and deteriorate the reproduction sound. For this reason, mount of the retention should be accurately effected. Accordingly, the cartridge of the class that is played by the player is limited to those having a certain notch formed on the associated position. This renders the cartridge inconvertible and is inconvenient to the user. Moreover, movement of the cartridge from the nonplaying position to the playing position and vice versa is effected against the bias of the leaf spring. It is thus necessary for movement of the cartridge to provide a strong force, for example, if the cartridge is automatically moved by the use of an electromagnetic plunger, much consumption power and large size are required of the plunger. The conventional art by which the cartridge is held in the playing position with aid of the engaging portion formed in the cartridge is not well suitable for moving the cartridge in itself.

In addition, according to the conventional endless magnetic tape cartridge player, the cartridge is longitudinally inserted in the player housing through the opening in the housing and is held in the playing position. For this reason, the magnetic head against which the endless magnetic tape within the cartridge abuts is caused to be located in the inmost position in the player housing. This causes much trouble about cleaning of the magnetic head and related parts. Thus, a particular tool or the like is required to clean the magnetic head and related parts. The inventor has succeeded in obtaining a novel tape cartridge positioning apparatus by which all defects derived from the use of the prior apparatus for positioning the tape cartridge in the playing position are eliminated.

SUMMARY OF THE INVENTION

It is a primary object of the present invention to provide a tape cartridge positioning apparatus for an endless magnetic tape cartridge player, which is capable of positioning the tape cartridge in the playing position without employing engaging portions such as notch or the like formed on the cartridge.

Another object of the invention is to provide a tape cartridge positioning apparatus for an endless magnetic tape cartridge player, which enables the cartridge to be transversely inserted through an opening in the player housing into the player prior to position of the cartridge in the playing position.

A further object of the invention is to provide a tape cartridge positioning apparatus for an endless magnetic tape cartridge player, wherein the cartridge inserted in the player housing is laid on the deck on the player housing and is interposed between front and rear arms of a reciprocating lever member slidably mounted in the direction perpendicular to the direction in which the cartridge is inserted, cartridge being advance and moved to the playing position as the rear edge thereof is urged by the rear arm when the reciprocating lever member is moved from a first position to a second position.

Still further object of the invention is to provide a tape cartridge positioning apparatus for an endless magnetic tape cartridge player, wherein the reciprocating lever member is moved from the first position to the second position by a shifting means employing a rotational force of a rotary capstan for drivingly feeding the endless magnetic tape in the cartridge.

Another object of the invention is to provide a tape cartridge positioning apparatus for an endless magnetic tape cartridge player, wherein the reciprocating lever member moved to the second position is retained by a latching means to locate the cartridge in the playing position.

Another object of the invention is to provide a tape cartridge positioning apparatus for an endless magnetic tape cartridge player, wherein the rear arm is swingably provided on the reciprocating lever member and is urged by a spring, abutment of a pinch roller within the cartridge against the capstan is obtained by the bias of the spring when the cartridge is held in the playing position.

Another object of the invention is to provide a tape cartridge positioning apparatus for an endless magnetic tape cartridge player, wherein the latching means is automatically disengaged from the reciprocating lever member in relation to detection of an endmark or nonrecorded zone on the tape by a detection means.

Another object of the invention is to provide a tape cartridge positioning apparatus for an endless magnetic tape cartridge player, wherein the latching means releases retention of the reciprocating lever member at the same time the reciprocating lever member is returned from the second position to the first position by a tension spring, while the cartridge is moved from the playing position to the nonplaying position as the front edge thereof is urged by the front arm.

Yet another object of the invention is to provide a tape cartridge positioning apparatus for an endless magnetic tape cartridge player the shifting means is automatically operated in relation to insertion of the cartridge in the player housing whereby the reciprocating lever member is moved from the first position to the second position.

According to the present invention, the cartridge is adapted to transversely be inserted so that the magnetic head can be located adjacent the opening in the player housing to readily clear up the head. On the other hand, movement of the cartridge is made by utilizing rotational force of the capstan and bias of the tension spring. With this arrangement, it is not required to use an expensive and power-required electromagnetic plunger or similar driving means for the purpose of movement of the cartridge and thus the tape cartridge positioning apparatus is economically obtained.

For a fuller understanding of the nature and objects of the invention, reference should be had to the following detailed description taken in conjunction with accompanying drawings wherein:

DESCRIPTION OF THE PREFERRED EMBODIMENTS

Figure 1:
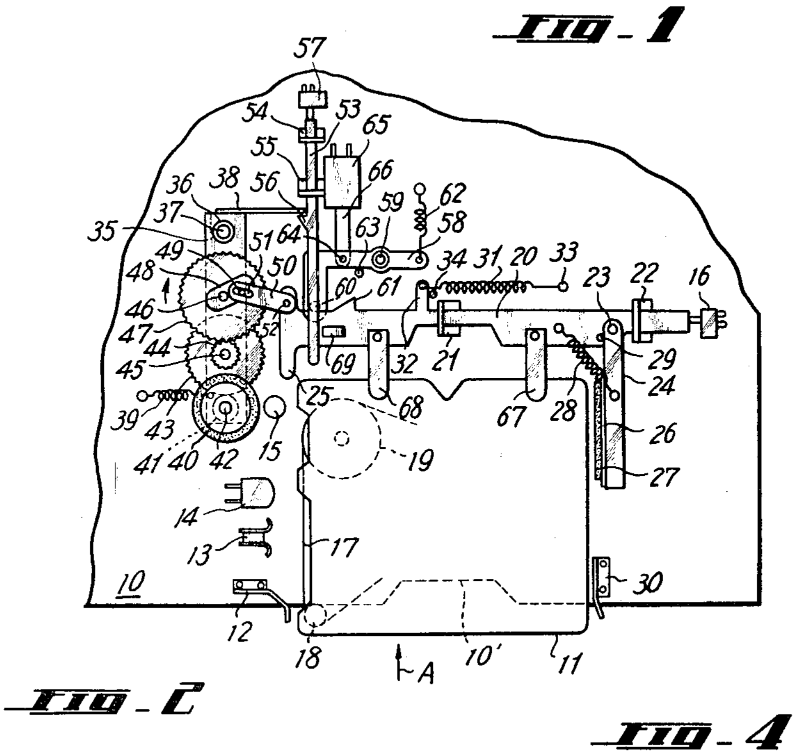
FIG. 1 is a representation explanatory of one embodiment of a tape cartridge positioning apparatus according to the present invention.

In FIG. 1, numeral 10 is a horizontal deck which is provided within a housing (not shown) for an endless magnetic tape cartridge player and on which is mounted an endless magnetic tape cartridge 11 inserted for play into an opening (not shown) formed in the housing, and a tape cartridge positioning apparatus, as will be detailed later, according to the invention. Much of the mechanism disposed beneath the deck 10 is omitted since it forms no part of the present invention. However, shown on the deck 10 are a guide member 12 for the cartridge, an endmark detection or search means 13, a magnetic head 14, a rotational capstan 15, and an electrical switch 16. As will later be described, the capstan 15 is adapted to be rotatably driven by an electrical motor (not shown) which is energized in relation to the closing of the switch 16.

The tape cartridge 11 includes a generally rectangular housing with a centrally disposed reel assembly (not shown) on which an endless magnetic tape 17 is wound and unwound in conventional manner. The endless tape 17 passes over a guide 18 and a pinch roller 19. The guide 18 and the pinch roller 19 are disposed adjacent the leading edge of the cartridge whereat the cartridge sidewall is cut away or disposed with the tape 17 is extended from the center of the hub of the reel (not shown) about the guide 18 and thence about the pinch roller 19 back to the outer periphery of a roll formed by the tape wound about the hub.

In a conventional endless magnetic tape cartridge player, the tape cartridge is inserted in the housing in a manner that the front edge of the cartridge is initially and longitudinally inserted in the housing, on the other hand, the present invention enables the cartridge to be transversely and oblongly inserted in the housing. To this end, the opening in the player housing (not shown) is of dimension to allow the cartridge 11 to be transversely inserted therein by providing an oblong shape.

The tape cartridge positioning apparatus according to the present invention includes a reciprocating lever member 20 slidably supported by guides 21 and 22 fixed to the deck 10. The lever member 20 is provided for moving the cartridge 11 which is inserted in the player housing from the direction of arrow A and is laid on the deck 10 toward the "play" position where the pinch roller 19 within the cartridge abuts against the capstan 15. Pivoted on a pin 23 at one portion of the lever member 20 is a rear arm 24, and a front arm 25 projects from the other portion thereof. The rear arm 24 includes a laterally extending flange 26 to which a pushing member 27 made of rubber sheet or the like is attached. The rear arm 24 is biased in the clockwise direction by a spring 28 but inward movement of the rear arm is limited by a stopper pin 29 on the lever member 20. The rear arm 24 is substantially parallel to the front arm 25 and the cartridge 11 is interposed therebetween which is guided through the opening in the player by a guide 30 mounted on the deck 10 and inserted in the direction of arrow A in the player housing.

A comparatively heavy tension spring 31 is interposed between a projecting portion 32 of the lever member 20 and a pin 33 mounted on the deck 10 to normally urge the lever member in the rightward direction. The rightward movement of the lever member 20 due to the tension spring 31 is prevented by abutment of the projecting portion 32 against a stopper pin 34 on the deck 10 whereby the lever member normally takes a first position as shown. The electrical switch 16 is actuated by the lever member at the one end thereof when in the first position but at this moment is opened.

A driving means for moving the lever member 20 in the leftward direction against the elastic force of the tension spring 31 includes a swing lever 35 swingably mounted by a sleeve 36 and a shaft 37 on the deck 10. The swing lever 35 is provided at one end portion thereof with a leaf spring 38 and is urged in the clockwise direction by a tension spring 39. A rubber-covered frictional wheel 40 and a gear 41 connected to each other are rotatably supported on an axis 42 on the swing lever 35. The frictional wheel 40 as will be described later is caused to abut against the capstan 15 by rotational of the swing lever 35 from the position as shown to the counterclockwise direction and is rotatably driven by the capstan 15. Integrally formed gears 43 and 44 are rotatably supported on an axis 45 on the swing lever 35. The gear 43 is adapted to mesh with the gear 41. Rotatably mounted on an axis 46 on the swing lever 35 are a gear 47 and an arm 48 which are connected with each other, with gear 47 meshing with the gear 44. The gears 41, 43, 44 and 47 constitute a reduction gearing and rotation of the frictional wheel 40 is reduced to be imparted to the arm 48. A link 50 has one end through which is bored an elongated slot 51 to pivotally receive a pin 49 mounted on the arm 48. The other end of the link 50 is pivotally mounted on the lever member 20 as indicated at 52.

An elongated actuating rod 53 of resilient material is slidably mounted by guides 54, 55 on the deck 10. A triangular hook portion 56 is integrally formed of the actuating rod 53 at the midportion thereof so as to engage the one end of the leaf spring 38. The actuating rod 53 is positioned above the lever member 20 and in the right-angle relation therewith. The actuating rod 53 has one end which extends to a position where the rod is urged by the side edge of the cartridge 11. An electrical switch 57 is mounted on the deck 10 to be opposed to the actuating rod 53 at the other end thereof. The switch 57 is not operated by the rod when in the position as shown but is operated when the actuating rod 53 is depressed by the cartridge 11 and thus slided.

A latch lever 58 is rotatably pivoted to a pin 59 mounted on the deck 10. A hook pin 60 is mounted on the latch member 58 and engageable with a triangular hook portion 61 formed with the lever member 20 as will be detailed later. The latch lever 58 is biased in the counterclockwise direction by a spring 62 but inward movement of the latch lever is limited by a stopper pin 63 on the deck 10. The latch lever 58 is pivoted at 64 to an actuator 66 at one end thereof for an electromagnetic plunger 65 mounted on the deck 10. The latch lever 58 as will later be described is clockwise and swingably driven by the plunger 65 against the bias of the spring 62 when the plunger 65 is energized.

Leaf springs 67 and 68 are rigidly mounted on the lever member 20 so as to leave a clearance from the deck 10 to receive the cartridge 11. Mounted on the lever member 20 is a projection 69 the surface of which is sharply slanted from left to right.

Figure 2:
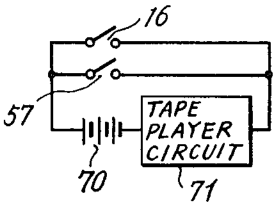
FIG. 2 shows a relationship between the two electrical switches in FIG. 2.

FIG. 2 is a schematic electrical diagram for the purpose of explaining the operation of the switches 16 and 57. The switches 16 and 57 are connected in parallel with each other and are also in series connected with an electrical source 70 and a tape player circuit 71. The tape player circuit 71 includes a motor (not shown) for rotatably driving the capstan 15 (FIG. 1) and a magnetic tape reproducing circuit having the magnetic head 14 (FIG. 1).

Figure 3:
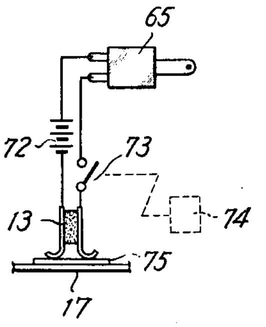
FIGS. 3 and 4 show electric diagrams showing control circuit different to each other for the electromagnetic plunger in FIG. 1.
Figure 4:
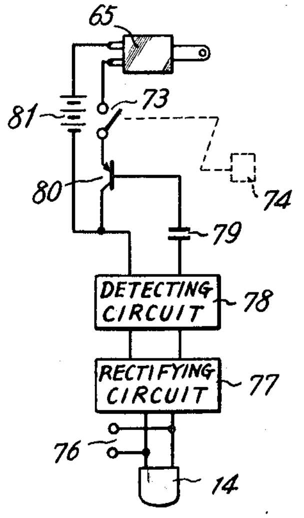

FIGS. 3 and 4 show control circuits different to each other the electromagnetic plunger 65 shown in FIG. 1. Similar numerals are used to illustrate like parts in FIG. 1.

In FIG. 3, the control circuit is such that an electrical source 72, the endmark detection or search means 13 and an electrical switch 73 are in series with one another in relation to the plunger 65. The switch 73 is built in a variable resistor 74 (indicated by the dotted line) for adjustment of reproducing sound volume, incorporated in a reproducing circuit for the tape cartridge player and is adapted to be closed when the variable resistor 74 is operated to minimize the reproducing sound volume. The endmark detector 13 has the two insulated feeler contacts which are shorted by an endmark 75 of conductive piece provided on the magnetic tape 17 within the cartridge 11. As will be later described, the feeler contacts for the endmark detector 13 are shorted by the endmark 75 on the tape after the switch 73 has been closed, and the plunger 65 is energized by the electrical source 72.

A control circuit in FIG. 4 for the electromagnetic plunger 65 is different from that shown in FIG. 3 and is capable of energizing the plunger 65 in response to detection of the nonrecorded zone between each recorded zones. In FIG. 4, similar numerals are used to illustrate like parts in FIG. 3. The output of the magnetic head 14 is applied through an output terminal 76 to a preamplifier (not shown) in the reproducing circuit (not shown) for the tape cartridge player, and is also applied to a rectifying circuit 77. The details of the rectifying circuit 77 are not illustrated but it is composed of a diode, a capacitor and a resistor to rectify and average the output signal from the magnetic head 14. The output of the rectifying circuit 77 is applied to a detecting circuit 78 constituted by, for instance, a Schmidt circuit. The detecting circuit 78 in case where the output signal from the rectifying circuit 77 exists, does not produce the output signal at the output side thereof but is arranged to generate the output voltage at the output side thereof when the output signal from the rectifying circuit 77 is broken-off a predetermined short period of time. That is, when the recorded zone of the tape 17 corresponds to the magnetic head 14, the output voltage of the detecting circuit 78 is zero while the predetermined volume of voltage is generated at the output side of the detecting circuit 78 when the nonrecorded zone on the tape 17 corresponds to the magnetic head 14. The output of the detecting circuit 78 is applied through a capacitor 79 between the base and collector electrodes of a PNP-transistor 80. The collector electrode of the transistor 80 is connected to a negative pole of an electrical source 81 and the emitter electrode of the transistor is connected through the switch 73 within the variable resistor 74 and the plunger 65 to a positive pole of the source 81. Where the output voltage is not produced from the detecting circuit 78, the voltage between the base and emitter is zero. Accordingly, even if the switch 73 is closed, no emitter-to-base current of the transistor 80 exists, hence, the path from emitter to collector is open circuited. Thus, the player 65 is not energized by the source by the source 81. When the output voltage is produced from the detecting circuit 78, the voltage is applied through the capacitor 79 between the base and collector of the transistor 80 while the switch 73 is closed, and the voltage between the base and emitter becomes negative. Therefore, the full current is flown from the emitter to the base, and the path from emitter to collector is short circuited. Thus, the plunger 65 is energized by the source 81. It will be readily apparent that as long as the switch 73 is opened, even if the output voltage is produced from the detecting circuit 78, the plunger 65 may not be energized.

The operation of the tape cartridge positioning apparatus shown in FIGS. 1 to 4 will be hereinafter described. In FIG. 1, the cartridge 11 is shown as being partially inserted through the opening in the player housing (not shown) into the housing. From the position as shown, the cartridge 11 is further inserted by the finger in the direction of arrow A to allow the side edge of the cartridge to abut against the one end of the actuating rod 53 to push and slide the same. When the cartridge 11 is inserted to the extent to be adjacent to the lever member 33, The switch 57 is operated by the actuating rod 53 and thus closed while the hook portion 56 of the actuating rod engages the one end of the leaf spring 38 whereby the swing lever 35 is swung by the actuating rod against the bias of the spring 39 to allow the frictional wheel 40 to abut against the capstan 15. As clearly shown in FIG. 2, closing of the switch causes the power to be applied to the tape player circuit 71 to thus rotatably drive the capstan 15. Rotation of the capstan 15 is imparted through the frictional wheel 40, the reducing gearing 41, 43, 44 and 47 to the arm 48 to rotate the latter in the direction of arrow as shown. Prior to rotation, the arm 48 is in the position as shown and the pin 49 on the arm 48 is located at the intermediate of the slot 51 in the link 50 to weaken connection relationship between the arm 48 and the link 50. As the arm 48 is rotated, the pin 49 is moved within the slot 51 to engage the one end thereof to strength connection relationship between the arm 48 and the link 50. Therefore, as the arm 48 keeps its rotation, the reciprocating lever member 20 is slided from the first position to the leftward direction against the bias of the tension spring 31. With slide movement of the lever member 30, the cartridge 11 is caused to be advancedly moved as the rear edge of the cartridge is urged by the rear arm 24. When the lever member 20 is slided in the leftward direction and the projection 69 on the lever member 20 is entered under the actuating rod 53, the actuating rod 53 is at the one end thereof raised upwardly by the projection 69 to release the actuating rod 53 from the side edge of the cartridge 11. Consequently, the actuating rod 53 is returned to its original position through the hook portion 56 by the bias of the leaf spring 38. By return of the actuating rod 53 to its initial position, the switch 57 is opened whereas the tape player circuit 71 is continuously supplied with the power as seen from FIG. 2 since the lever member 20 has been moved from the first position to the leftward direction to close the switch 16. For this reason, the capstan 15 is rotatably driven after the switch 57 has been opened. On the other hand, movement of the swing lever 35 due to the actuating rod 53 is prevented by return thereof to the original position, however, the swing lever 35 is given a counterclockwise rotational force through the arm 48, link 50 and the lever member 20 under the influence of the spring 31 so that the swing lever 35 is not returned to its original position even by dint of the bias of the spring 39. Thus, abutment of the frictional wheel 40 against the capstan 15 is maintained even after the actuating rod 53 has been returned to its initial position. Abutment of the frictional wheel 40 against the capstan 15 is increased in its force as the tension spring 31 is stretched and power transmission is secured with increase of the load. When the lever member 20 is further moved in the leftward direction, the hook portion 61 passes beyond the hook pin 60 on the latch lever 58 and moved to the left side of the pin 60. At this moment, the cartridge 11 has been moved to the playing position where the pinch roller 19 within the cartridge abuts against the capstan 15. As a result, further movement of the cartridge is prevented by abutment of the pinch roller 19 against the capstan 15. When the arm 48 makes approximately one rotation, the lever member 20 is caused to be moved to the most leftward direction, however, still further rotation of the arm 48 initiates movement of the lever member 20 to the rightward direction. This rightward movement of the lever member 20 is prevented by engagement of the hook portion 61 with the hook pin 60 on the latch lever 58. With engagement of the hook pin 60 with the hook portion 61, a counterclockwise rotational force of the swing lever 35 by the tension spring 31 is dissipated so that the swing lever 35 is gradually moved in the counterclockwise direction by the elastic force of the spring 39 and thus the frictional wheel 40 is away from the capstan 15. Rotation of the arm is, therefore, prevented. In the manner as mentioned above, the lever member 20 is caused to be moved to a second position where the hook portion 61 engages the hook pin 60, and is thereby retained. Where the lever member 20 is retained in the second position, the cartridge 11 is moved as the rear edge thereof is urged by the rear arm 24 under influence of the spring 28 to ensure abutment of the pinch roller 19 against the capstan 15, and the cartridge 11 is thus held in the "play" position. The cartridge 11 held in the "play" position is prevented not only from transversely moving by the lever member 20 and the guide member 12 but also from upwardly moving by the leaf springs 67, 68 so that a relative position of the cartridge 11 with respect to the endmark detector 13, magnetic head 14 and the capstan 15 is immovably maintained.

The operation as to how to suspend the play of the cartridge 11 held in the "play" position will be readily understood from the following description.

The switch 73 in FIG. 3 is caused to be closed if the variable resistor 74 is operated to minimize the reproducing sound. After the switch 73 has been closed, the reproducing sound from the tape player can not be heard, however, the tape 17 is still drivingly transported since the cartridge 11 is held in the "play" position. The tape 17 keeps its feeding and the endmark 75 on the tape 17 is brought to correspond to the endmark detector 13 to short the feeler contacts of the endmark detector 13, and the plunger 65 is thus energized by the source 72. When the plunger 65 is energized, the actuator 66 is drawn at the same time the latch lever 58 is clockwise swung against the bias of the spring 62. As the latch lever 58 is swung, the hook pin 60 is allowed to be moved to disengage it from the hook portion 61 of the lever member 20. Accordingly, the lever member 20 is returnedly moved from the second position to the rightward direction under the influence of the tension spring 31. At this moment, the arm 48, the gearing 47, 44, 43 and 41, and the frictional wheel 40 are skidded through the link 50 to serve as governor action when the lever member 20 is returned to its original position. Rightward movement of the lever member 20 is prevented by the projecting portion 32 being engaged with the stopper pin 34 to return the lever member 20 to its initial position. At the moment when the lever member 20 is returned from the second position to the first position, the cartridge 11 is admitted to be moved from the "play" position to the "nonplay" position as the front edge thereof is urged by the front arm 25. Thus, the pinch roller 19 is away from the capstan 15 to suspend transportation of the tape 17. And, the switch 16 is operated and opened by the lever member 20 returned to the first position to arrest rotation of the capstan 15. In response tó detection of the endmark 75 on the tape 17 by the endmark detector 13, the cartridge 11 is shifted to the "nonplay" position whereby with the so-called "ahead-action," a recording starting position of the endless magnetic tape 17 for cartridge 11 which completes its play is automatically transferred to the next-played starting position.

A notch 10′ is formed on the deck 10 so as to draw the cartridge 11 moved to the "nonplay" position.

A way to cease the play of the cartridge 11 held in the playing position will be hereinafter explained with reference to the operation of the control circuit shown in FIG. 4.

Now, where the cartridge 11 is held in the "play" position and in case musical performances recorded on the magnetic tape 17 are reproduced, the variable resistor 74 is operated to minimize the reproducing sound and the switch 73 is thus closed. After the switch 73 has been closed, the reproducing sound from the cartridge player softened whereas the tape 17 continues its running. The recorded zone on the tape 17 which records musical performances and discontinues and reproduction entirely passes over the magnetic head 14, and successively the nonrecorded zone on the tape 17 corresponds to the magnetic head 14 thereby substantially dissipating the output signal from the magnetic head. As a result, the output voltage from the rectifying circuit 77 is zero and the detecting circuit 78 produces the output voltage by which the path from the emitter to collector of the transistor 80 is short circuited, and the electromagnetic plunger 65 is energized by the source 81.

It will be readily understood that in relation to energization of the plunger 65, the cartridge 11 is moved from the "play" position to the "nonplay" position. According to the control circuit in FIG. 4, in relation to detection of the nonrecorded zone on the tape 17, the cartridge 11 is moved from the "play" position to the "nonplay" position so that when the cartridge 11 is subsequently played the reproducing begins with starting position of the recorded zone on the tape 17.

While the invention has been described as preferred embodiments of the tape cartridge positioning apparatus, illustrative embodiments described above shown in the drawings are obviously susceptible of modification in form and detail within the spirit of the invention. For instance, the spring 39 in FIG. 1 may not be necessarily required for the following reason. If the arm 49 made one-half rotation and subsequently rotates to form the slightest angle, the swing lever 35 is clockwise rotated by the link 50 as mentioned above and then the frictional wheel 40 is disengaged from the capstan 15 without aid of any means.

The invention and its attendant advantages will be understood from the foregoing description. It is to be understood that change and variation may be made without departing from the spirit and scope of the invention as defined in the appended claims.

What is claimed is:

1. A tape cartridge positioning apparatus for an endless magnetic tape cartridge player which has a housing provided with a tape-driving means including a rotary capstan for drivingly feeding an endless magnetic tape in the cartridge in cooperation with a pinch roller and a tape reproducing circuit including a magnetic head, comprising:

a deck mounted within said housing and carrying said capstan and said magnetic head located thereon;

an opening formed on said housing, said opening being of dimension to the least to allow said cartridge to be transversely inserted in said housing, said cartridge being transversely inserted through said opening and laid on said deck;

said head and said capstan being aligned along a path parallel to the path of insertion of said cartridge, the alignment path of said head and said capstan being spaced to one side of said opening;

a reciprocating lever member slidably mounted on said deck in the direction perpendicular to the direction in which said cartridge is inserted, said lever member having front and rear arms substantially parallel to each other, said cartridge being interposed between said front and rear arms, said front and rear arms being opposed to said cartridge at the front and rear edges thereof, respectively;

a tension spring for exerting slidable movement force in one direction on said reciprocating lever member;

a stopping member provided on said deck for preventing slidable movement force of said reciprocating lever member due to said tension spring, whereby said reciprocating lever member being normally positioned in a first position where said cartridge inserted in said housing is interposed between said front and rear arms;

a shifting means for shifting said reciprocating lever member from said first position to a predetermined second position against the bias of said tension spring, said shifting means having a swing lever swingably mounted on said deck, a frictional wheel rotatably provided on said swing lever, a rotary member rotatably provided on said swing lever, means for decelerating rotation of said frictional wheel and imparting it to said rotary member, and a connecting member joining a portion away from the center of rotation of said rotary member to a portion of said reciprocating member, said frictional wheel abutting against said capstan by swing movement of said swing lever to allow said frictional wheel to rotatably drive by said capstan whereby said rotary member is rotated while said reciprocating lever member is moved through said connecting member from said first position to said second position against the bias of said tension spring, said swing lever being biased by the bias of said tension spring to a position where said frictional wheel abuts against said capstan for the period when said reciprocating lever member is moved from said first position to said second position, as said reciprocating lever member is moved to said second position by said shifting means said rear edge of said cartridge being depressed by said rear arm and moved to a playing position where said pinch roller within said cartridge abuts against said capstan;

actuating means for swinging said swing lever, when said reciprocating lever member is in said first position, to the position where said frictional wheel abuts against said capstan;

a latching means for retaining said reciprocating lever member which is moved to said second position by said shifting means, said cartridge being held in the playing position by retention of said reciprocating lever member by said latching means, said swing lever being swung to a position where said frictional wheel is away from said capstan in relation to retention of said reciprocating lever member by said latching means;

a release means for releasing retention operation of said latching means, in response to operation of said release means said latching means being disengaged from said reciprocating lever member, said reciprocating lever member being returned to said first position by the bias of said tension spring at the same time said cartridge being retracted from the playing position as said front edge thereof is urged by said front arm.

2. A tape cartridge positioning apparatus for an endless magnetic tape cartridge player in accordance with claim 1 wherein said latching means includes a latching lever swingably pivoted to said deck, said latching lever including a hook member engageable with a hook portion provided on said reciprocating lever member when the latter is moved to said second position, said latching lever being biased by a spring in a direction in which said hook member engages said hook portion.

3. A tape cartridge positioning apparatus for an endless magnetic tape cartridge player in accordance with claim 2 wherein said release means comprises an electromagnetic plunger in which an actuator is connected to said latching lever and a control circuit for said plunger, in response to energization of said plunger by said control circuit said latching lever being moved against the bias of said spring to a position where said hook member on said latch lever is disengaged from said hook portion of said reciprocating lever member.

4. A tape cartridge positioning apparatus for an endless magnetic tape cartridge player in accordance with claim 3 wherein said control circuit includes an electrical switch operated and closed when desired and two insulated feeler contacts, said components having an endmark detector located on said deck and shorted by an endmark of a conductive foil mounted on said endless magnetic tape and an electrical squrce for energizing said electromagnetic plunger, and electrically connected in series with said electromagnetic plunger being said switch, endmark detector, and said electrical source.

5. A tape cartridge positioning apparatus for an endless magnetic tape cartridge player in accordance with claim 4 wherein said electrical switch is operated in relation to operation of a variable resistor in said reproducing circuit for adjustment of reproducing sound volume, said electrical switch being closed when said variable resistor is adjusted to minimize sound volume.

6. A tape cartridge positioning apparatus for an endless magnetic tape cartridge player in accordance with claim 3 wherein said control circuit further includes an electrical switch operated and closed when desired, a detecting means detecting that the nonrecorded zone between the recorded zones on said magnetic tape passes over said magnetic head and producing the output signal, a transistor in which an emitter electrode and collector electrode are short circuited by application of the output signal of said detecting means to a base electrode, and an electrical source for energizing said electromagnetic plunger, and electrically connected in series with said electromagnetic plunger being said switch, said emitter and collector electrodes, and electrical source.

7. A tape cartridge positioning apparatus for an endless magnetic tape cartridge player in accordance with claim 6 wherein said electrical switch is operated in relation to operation of a variable resistor in said reproducing circuit for adjustment of reproducing sound volume, said electrical switch being closed when said variable resistor is adjusted to minimize sound volume.

8. A tape cartridge positioning apparatus for an endless magnetic tape cartridge player in accordance with claim 1 wherein said actuating means includes a rod member slidably mounted on said deck and movable when one end of said rod member is depressed and engaged by the side edge of said cartridge inserted in said housing, said rod member having a hook portion engageable with one end of a leaf spring the other end of which is fixed to said swing lever, said swing lever being swung through said hook portion, said leaf spring to the position where said frictional wheel abuts against said capstan when said rod member is depressed by said cartridge and moved, during movement of said reciprocating lever member from said first position to said second position said rod member being brought to a position where, by a projection formed of said reciprocating lever member, the one end of said rod member is disengaged from said side edge of said cartridge, said rod member being returned to its original position by the bias of said leaf spring.

9. A tape cartridge positioning apparatus for an endless magnetic tape cartridge player in accordance with claim 1 wherein said rear arm is swingably provided on said reciprocating lever member and is given a rotational force by a spring while rotation thereof is limited by a stopper mounted on said lever member to a position approximately parallel to said front arm, said rear arm being away from said stopper and urgedly abutting against the rear edge of said cartridge by the bias of said spring when said reciprocating lever member is retained in said second position by said latching means.

* * * * *